United States Patent
Sørensen

(10) Patent No.: US 6,702,554 B1
(45) Date of Patent: Mar. 9, 2004

(54) TANK AND A CENTRIFUGAL PUMP FOR EMPTYING THE TANK

(75) Inventor: Eric Aarestrup Sørensen, Espergarde (DK)

(73) Assignee: Emil Aarestrup Sørensen, Staanstad (CH)

( * ) Notice: Subject to any disclaimer, the term of this patent is extended or adjusted under 35 U.S.C. 154(b) by 0 days.

(21) Appl. No.: 10/088,946

(22) PCT Filed: Nov. 3, 2000

(86) PCT No.: PCT/DK00/00612

§ 371 (c)(1),
(2), (4) Date: Mar. 22, 2002

(87) PCT Pub. No.: WO01/33083

PCT Pub. Date: May 10, 2001

(30) Foreign Application Priority Data

Nov. 5, 1999 (DK) .................................. 1999 01599

(51) Int. Cl.[7] .................................................. F04B 17/00
(52) U.S. Cl. ............ 417/420; 417/423.15; 417/424.1; 415/229
(58) Field of Search ............................... 417/420, 365, 417/366, 423.12, 423.15, 424.1; 415/104, 229

(56) References Cited

U.S. PATENT DOCUMENTS

| | | | | |
|---|---|---|---|---|
| 2,799,227 A | * | 7/1957 | Allen | 103/87 |
| 3,704,960 A | * | 12/1972 | Zagar | 415/131 |
| 3,981,628 A | * | 9/1976 | Carter | 417/247 |
| 5,302,091 A | * | 4/1994 | Horiuchi | 417/420 |
| 5,413,459 A | * | 5/1995 | Woodall et al. | 415/104 |
| 5,895,203 A | | 4/1999 | Klein | 415/122.1 |
| 5,946,767 A | * | 9/1999 | Sinz | 15/302 |
| 5,961,301 A | * | 10/1999 | Wasserman et al. | 417/420 |
| 6,468,028 B1 | * | 10/2002 | Rockwood | 415/58.4 |

FOREIGN PATENT DOCUMENTS

| | | |
|---|---|---|
| DE | 42 27 249 A1 | 2/1994 |
| DE | 296 10 799 U1 | 4/1997 |
| EP | 0 318 638 A2 | 6/1989 |
| WO | WO 97/27403 A1 | 7/1997 |

* cited by examiner

Primary Examiner—Justine R. Yu
Assistant Examiner—Han L Liu
(74) Attorney, Agent, or Firm—Dykema Gossett PLLC

(57) ABSTRACT

The invention relates to a liquid tank with centrifugal pump with a substantially vertical pump shaft for discharging of the liquid, wherein the pump is arranged with the intake side at the bottom of the tank and via a drive shaft connected to drive means preferably arranged above the tank, where the drive shaft with a coupling is in operable connection with the pump shaft, and wherein the pump near the coupling has a first main shaft at the upper end of the pump shaft and a second main bearing opposite the coupling at the lower end of the pump shaft near the tank bottom, and wherein there is connection between the discharge side of the pump step opposite each bearing and the bearing faces of the relevant bearing, and wherein there is provided an outlet from each bearing to the intake side of the pump step. According to the invention the first main bearing near the coupling at the upper end of the pump shaft is a purely radial bearing, and the second main bearing opposite the coupling at the lower end of the pump shaft is a radial and axial bearing.

12 Claims, 4 Drawing Sheets

TANK AND A CENTRIFUGAL PUMP FOR EMPTYING THE TANK

Figure 1:
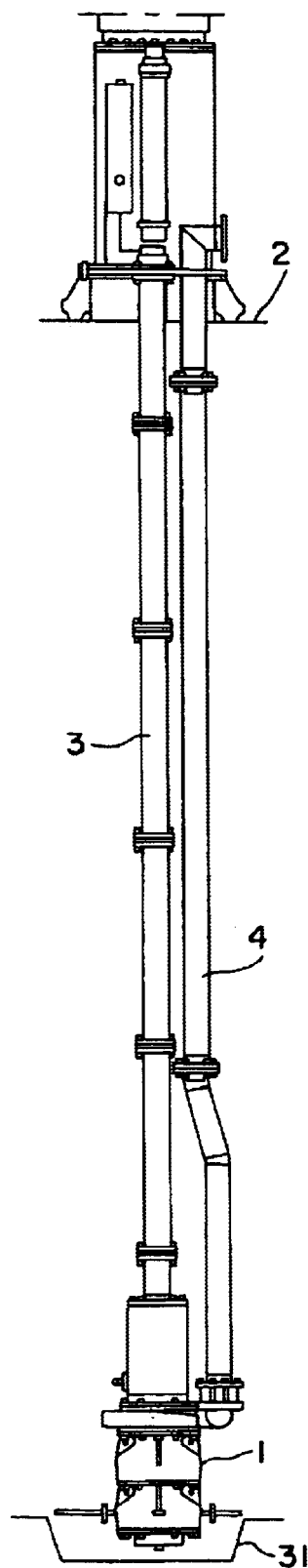

The invention relates to a tank for liquids and a centrifugal pump for discharging the liquid having a substantially vertical pump shaft, wherein the pump is configured with the intake side at the bottom of the tank and connected, via a drive shaft, to drive means preferably arranged above the tank, wherein the drive shaft with a coupling is in operable connection with the pump shaft, and wherein the pump is, near the coupling, provided with a first main bearing at the upper end of the pump shaft and a second main bearing opposite the coupling at the lower end of the pump shaft near the tank bottom, and wherein a connection is established between the discharge side of the pump step opposite each bearing and the bearing faces of the relevant bearing, and wherein a drain is provided from each bearing to the intake side of the pump step.

Examples of liquid tanks, for which the invention is useful, include the tanks of a tanker, but also other types of tanks whose contents are discharged by means of a pump arranged at the tank bottom are included in the invention. The supply of lubricant, which in this case means pump medium, to each of the main bearings of the pump is accomplished through a passage from the discharge side of the pump step that is situated opposite the relevant bearing to the interior bearing faces of the bearing. In that case each bearing has a drain for lubricant to the intake side of the corresponding pump step. As soon as the pump is operative and there is liquid present in the tank, the lubricant for the bearings will be pressurised.

The problem associated with these pumps occur if they are allowed to run without liquid present in the tank which may occur when the tank is emptied unless the pump is turned off as soon as the tank is empty. When this occurs, in particular those portions of the main bearings that absorb the axial forces are exposed to comprehensive heating, which leads to breakdown.

The components for the axial bearings carry the total weight of the shaft with associated blade wheels, which is a considerable weight, and thereby comprehensive friction heat will be generated unless the bearings are lubricated sufficiently.

In order to remedy this problem the first main bearing near the coupling at the upper end of the pump shaft is a purely radial bearing, and the second main bearing opposite the coupling at the lower end of the pump shaft is a radial and axial bearing.

The pump being only to a small extent auto-adsorbing, residual liquid will always remain in the tank that is not pumped up. However, this residue is sufficient to ensure that the lowermost main bearing at the intake side of the pump is always completely or partially immersed into the liquid. Hereby the external cooling of this bearing is ensured.

Besides, a certain amount of the liquid from the tank bottom is occasionally drawn into the pump, e.g. so much that the liquid level no longer covers the inlet and hereby a liquid pressure will be generated in the passage from the intake side of the first pump step to the bearing surfaces of the lower main bearing with the result that the bearing is lubricated and cooled. When the liquid surface no longer covers the pump inlet the liquid drawn into the pump will return to the tank and a renewed sucking procedure will occur. To a certain extent this will effect lubrication and cooling of the lowermost main bearing such that the axial bearing of the pump is ensured a certain degree of cooling and a certain degree of lubrication. Since simultaneously the upper bearing is a purely radial bearing, it tolerates to a higher degree to run without lubrication and cooling, since—due to the vertical pump shaft no it is not correspondingly heavily strained.

According to one embodiment of the invention the main bearings have bearing faces of carbon or silicon carbide. Carbon bearings tolerate extremely elevated temperatures and besides carbon bearings contain a certain amount of graphite, which renders the bearing faces auto-lubricating. Bearings with bearing faces of silicon carbide have low friction and simultaneously adequate heat conductivity and thus, on the one hand, the friction heat will not be overwhelming and the heat that is generated is conveyed away by heat conductivity. Besides, both materials tolerate impurities in the lubricant, which will often occur when the pumping medium is used as lubricant.

Particularly conveniently the upper main bearing has bearing faces in carbon and the lower has bearing faces of silicon carbide. Hereby the properties of the two bearing materials are used optimally, since the upper bearing benefits from the auto-lubricating properties and the heat conductivity of the carbon material, and the low friction of the silicon carbide bearing at the bottom ensures low generation of heat and adequate heat conduction.

Tankers can carry many kinds of media, e.g. aggressive and poisonous media or consumption media. The drive shaft is surrounded by a jacket filled with oil or corresponding lubricant to lubricate the bearings of the drive shaft, and it must be ensured both that this lubricant does not pollute the tank contents and that the tank contents do not penetrate into and pollute the lubricant. Therefore the coupling between the drive shaft and the pump shaft is conveniently a magnetic coupler in order to thereby ensure complete separation between the oil-lubricated and the pump-medium-lubricated parts of the construction.

Besides it is a problem that often the liquid in the tank contains impurities that may cause wear to the bearings and in particular if the impurities contain magnetic material, such as e.g. non-oxidised iron in rust particles, they will deposit on the magnetic coupler which will, in the worst case, cause perforation of the membrane that separates the two sides of the magnetic coupler. Therefore, in the connection between the discharge side of a pump step and the bearing faces of the associated main baring, a filter is provided for separation of impurities and preferably a cyclone filter.

Hereby it is ensured that the bearings are not exposed to particles that can cause deposits and wear. This is important in particular to the connection to the upper bearing since the liquid that is supplied here as lubricant also lubricates and cools the area between the interior side of the magnetic coupler and the membrane that separates oil-lubricated and pump-medium-lubricated elements. A filter can be avoided at the lower main bearing, in particular if it is made with a bearing face of a hard material, such as silicon carbide.

A particularly advantageous filter is a cyclone filter since it does not have filter portions that are to be exchanged or cleaned. The residual fraction from the cyclone filter is recycled to the pump during the pump step in which the supply occurs.

The invention also relates to use of a liquid tank and a centrifugal pump according to claim 1 as a storage tank on a tanker. With this use it is accomplished that the discharge of the storage tank becomes an extremely reliable operation and the pump breakdowns that will occur as a consequence of belated interruption of the pump after the discharge operation of the tanker's storage tanks can largely be avoided.

Figure 2:
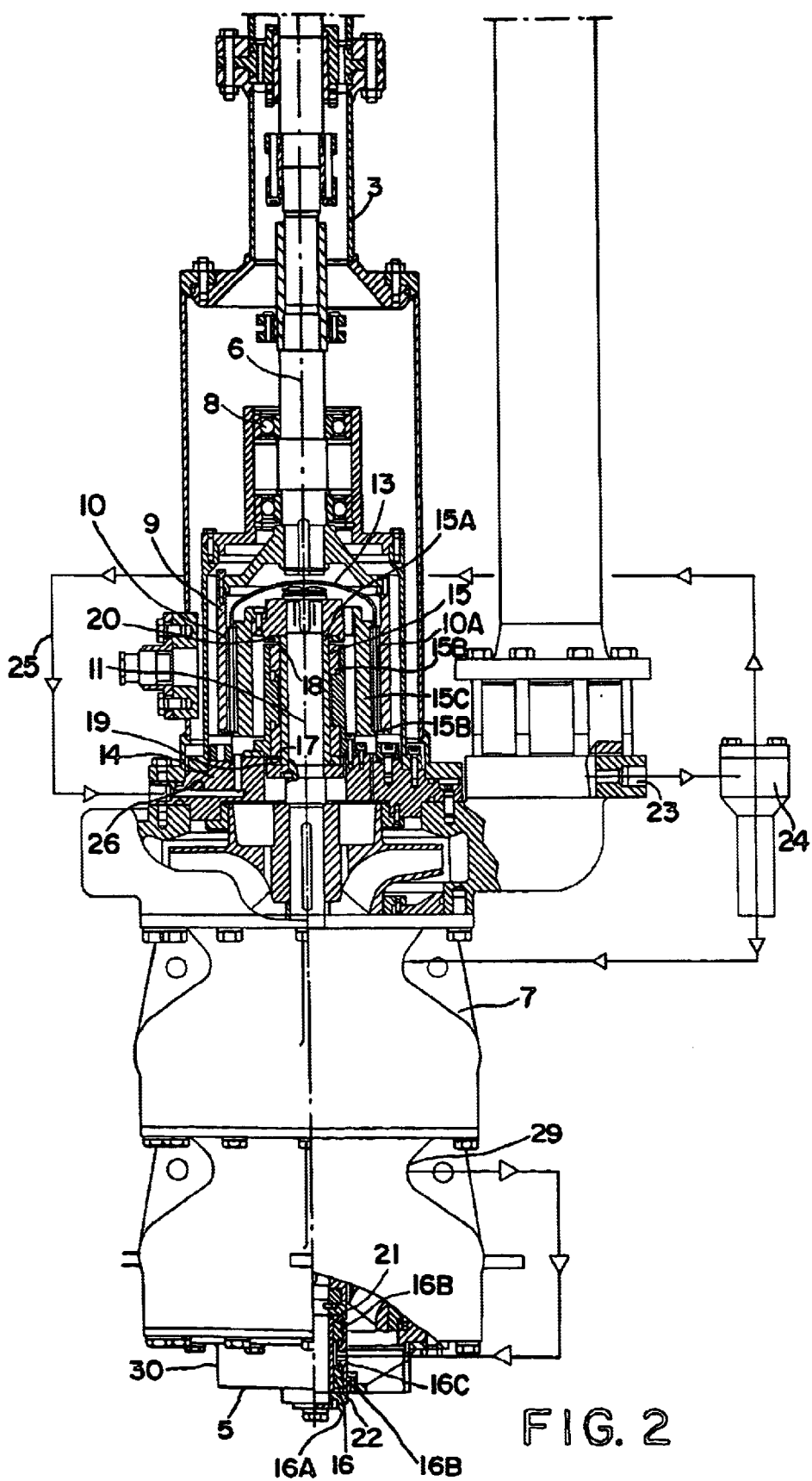
Figure 3:
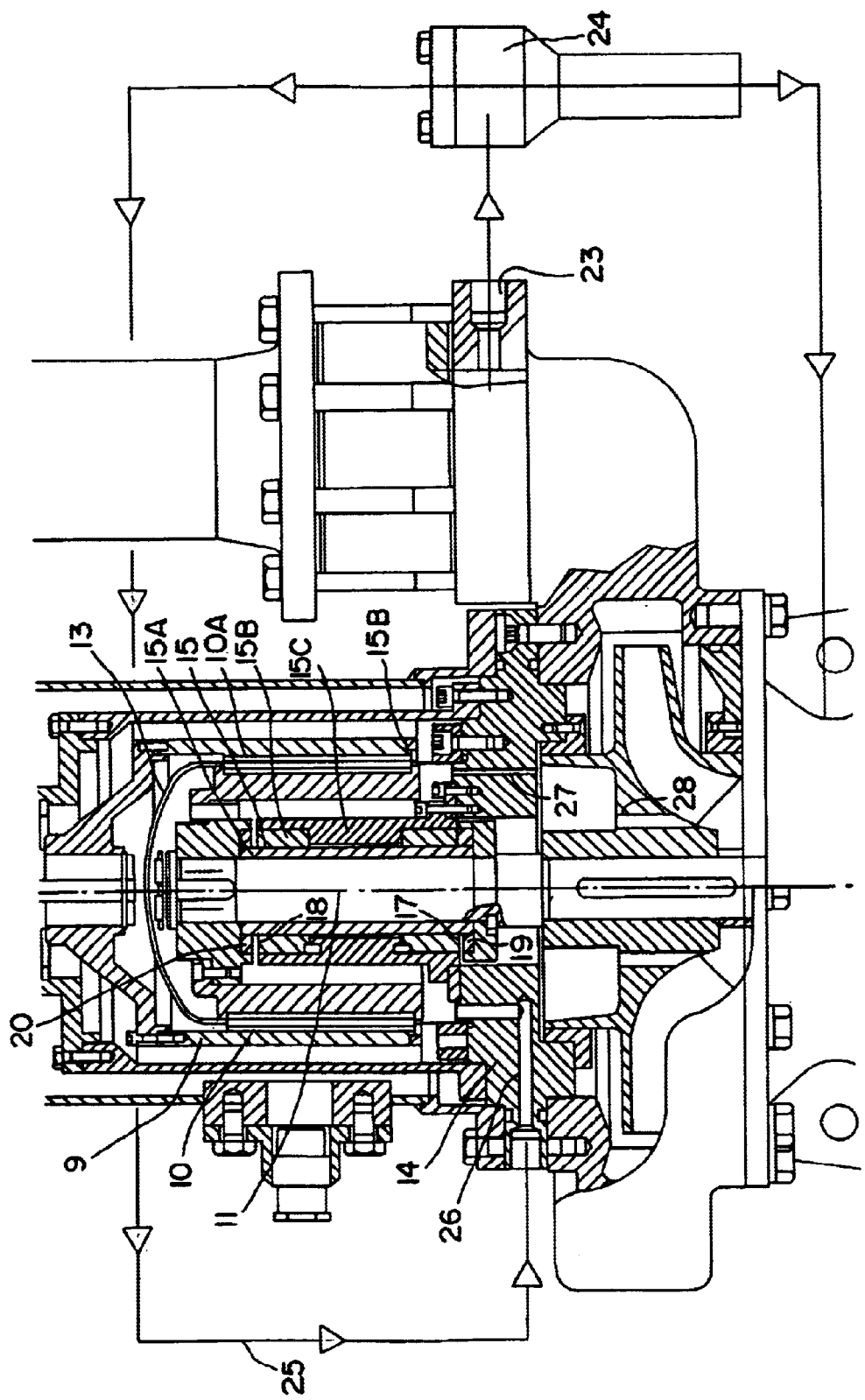
Figure 4:
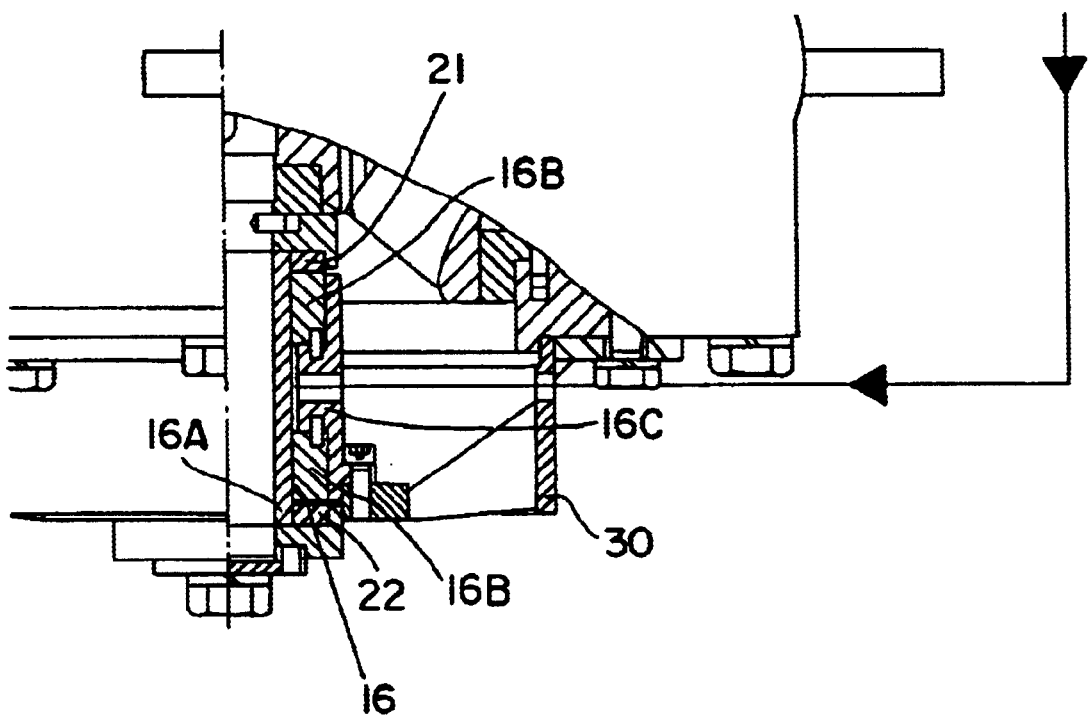

In the following, an exemplary embodiment of the invention will be described in detail with reference to the drawings, wherein FIG. 1 is a lateral view of a pump arranged at the bottom of a tank, FIG. 2 shows a partial section view of the pump, FIG. 3 shows an enlarged section of the area around the upper main bearing; and FIG. 4 is an enlarged sectional view of the area around the lower main bearing.

FIG. 1 illustrates an example of a pump 1 arranged in a liquid tank, in this case a storage tank in a tanker, where a motor (not shown) is arranged above the tank on the ship's deck 2, which motor will—via a shaft, FIG. 2, reference numeral 6, be in operable connection with the pump 1. The shaft 6 is arranged in an oil-filled pipe 3 that leads from the motor and down to the pump 1. At the bottom the pump 1 has an inlet 5 at a distance from the tank bottom such that the liquid can be conveyed onwards to the inlet 5, and from the pump 1 a discharge pipe 4 extends that conveys the liquid upwards to deck level. As shown in FIG. 1 the pump is arranged with the inlet 5 in a hollow 31 in the tank bottom, which contributes to ensuring a complete or almost complete emptying of tanks.

FIG. 2 is a partially sectional view through the pump 1 that is configured in accordance with one embodiment of the invention. The drive shaft 6 in the oil-filled pipe 3 is secured relative to the pump housing 7 of the pump 1 by a ball bearing 8, and below the ball bearing 8 a cylindrical skirt 9 is coupled to the drive shaft 6, the interior side of which is coated with permanent magnets 10. A cylindrical skirt 12 corresponding to the cylindrical skirt 9 is coupled to the pump shaft 11, and with permanent magnets 10A on the outside. Between the two sets of permanent magnets 10 and 10A a bell-shaped membrane 13 is arranged that is, at the bottom along its rim, hermetically connected to the cover 14 of the pump housing 7, and in that case the membrane 13 separates the oil-lubricated parts of the construction from those parts that are lubricated with the liquid in the tank, viz in this context the bearings of the pump.

The first main bearing 15 of the pump, at the top, is shown in large scale in FIG. 3, and the second main bearing 16, at the bottom, is seen in large scale in FIG. 4. The bearings are slide bearings with each their internal bearing ring 15A and 16A permanently mounted on the shaft 11, and each two external bearing rings 15B and 16B that are mounted permanently in external bearing holders 15C and 16C, each in permanent connection with the pump housing 7. The external bearing rings 15B in the upper main bearing 15 absorbs only radial forces since a slot 17 and 18 is configured between the bearing rings 15B and the associated bearing rings 19 and 20 that absorb axial forces. Bearing rings 19 and 20 that absorb axial forces can optionally be eliminated, but they remain in the pump for safety reasons.

In the lower main bearing, bearing rings 21 and 22 that absorb axial forces are arranged that are solidly connected to the shaft 11 and have axial bearing faces facing towards the two bearing rings 16B. The bearing rings 21 and 22 that absorb axial forces support the axial forces of the pump shaft.

From the discharge side of the last pump step there is an outlet 23 for pump medium for use for lubrication and cooling of the upper bearing. From the outlet 23 there is, above a filter device 24, a connection that, via a passage 26 in the cover of the pump housing 7, to convey the highly pressurized pump medium into the area of the bearing 15 and into the area between the membrane 13 and the interior side of the magnetic coupler. Further passages 27 in the cover and passages 28 in the rotor of the last pump step constitute drains for the lubricant to the intake side of the last pump step. A system of passages ensures distribution of the lubricant to the affected faces and this is not mentioned in further detail.

Since the lubricant from the tank enters into contact with the magnetic coupler it is extremely important that the lubricant does not contain magnetic or magnetisable material, since such material will deposit on the magnets 10, 10A and lead to breakdown of the magnetic coupler. Therefore the filter device 24 is extremely important in the lubrication of the top bearing, and it is necessary to select a reliable filter device. In the current example a cyclone separator is selected that removes heavy particles from the pumping medium and thus safely removes rust or iron particles, if any.

The lower main bearing 16 is lubricated in a corresponding manner. An outlet 29 from the discharge side of the first pump step is in liquid communication with the bearing faces of the main bearing 16. Selection of a strong bearing material makes this bearing less sensitive to pollution of the lubricant and thus a filter device can be avoided, but the filter can be used if the need arises.

In operation both main bearings 15,16 are lubricated for as long as the liquid level in the tank reaches beyond the annular flange 30 around the inlet. When the liquid level reaches a point below the lower rim of the flange 30, the pumping effect of the centrifugal pump 1 breaks down and the liquid in the pump 1 and the pipe 4 returns down into the hollow 31 of the tank. During continued operation of the pump 1, lubrication of the upper main bearing 15 will cease, but it being a radial bearing it is not particularly exposed, and if it also has bearing faces of carbon it tolerates elevated temperatures and due to the auto-lubricating effect the bearing does not break down until after a protracted period of dry operation.

On its way the liquid that returns to the hollow 31 will pass exteriorly past the lower main bearing 16 and cool the bearing. Once the liquid has returned, the liquid level in the hollow 31 will rise and optionally rise so high that, once again, the pump 1 starts to raise the liquid. Hereby some lubrication of the lower bearing 16 occurs since the outlet 29 is again pressurised. In the event of dry operation, the lower main bearing 16 is occasionally lubricated and it will be cooled off exteriorly. This effect is sufficient for both radial and axial bearing faces to survive for longer during periods of dry operation. In particular if the bearing has bearing faces of silicon carbide that has exhibits friction and adequate conductivity, improved longevity of the bearing is obtained in the event of dry operation.

What is claimed is:

1. A liquid tank and a centrifugal pump (1) with a substantially vertical pumping shaft (11) for discharge of the liquid, wherein the pump (1) is arranged with an intake side (5) at a bottom of the tank and via a drive shaft (6) is connected to drive means that are preferably arranged above the tank, wherein the drive shaft (6) with a coupling (10, 10A) is in operable connection with the shaft (11) of the pump (1), and wherein the pump (1) near the coupling (10,10A) has a first main bearing (15) at an upper end of the pump shaft (11) and a second main bearing (16) opposite the coupling (10, 10A) at a lower end of the pump shaft (11) near the tank bottom, and wherein there is connection between a discharge side of the pump step opposite each bearing (15,16) and bearing faces of the bearing in question, and wherein there are drains from each bearing to an intake side of the pump step, characterised in that the first main bearing (15) near the coupling (10,10A) at the upper end of the pump shaft (11) is a purely radial bearing (15), and that the second main bearing (16) opposite the coupling (10, 10A) at the lower end of the pump shaft (11) is a radial and axial bearing.

2. A liquid tank and centrifugal pump (1) according to claim 1, characterised in that the main bearings (15,16) have bearing faces of carbon or silicon carbide.

3. A liquid tank and centrifugal pump (1) according to claim 1, characterised in that the coupling (10, 10A) between the drive shaft (6) and the pump shaft (11) is a magnetic coupler.

4. A liquid tank and centrifugal pump (1) according to claim 1, characterised in that, in the connection (25) between the discharge side of a pump step and the associated bearing faces of the main bearing, a filter 24) is provided for separating impurities and which is preferably a cyclone filter.

5. A liquid tank and centrifugal pump (1) according to claim 4, characterised in that the residual fraction from the cyclone filter (24) is recycled to the pump for the pump step from where the outlet for lubricant is effected.

6. The use of a liquid tank and centrifugal pump (1) according to claim 1 as storage tank on a tanker.

7. A liquid tank and a centrifugal pump (1) with a substantially vertical pumping shaft (11) for discharge of the liquid, wherein the pump (1) is arranged with an intake side (5) at a bottom of the tank and via a drive shaft (6) is connected to drive means that are preferably arranged above the tank, wherein the drive shaft (6) with a coupling (10, 10A) is in operable connection with the shaft (11) of the pump (1), and wherein the pump (1) near the coupling (10,10A) has a first main bearing (15) an the upper end of the pump shaft (11) and a second main bearing (16) opposite the coupling (10, 10A) at a lower end of the pump shaft (11) near the tank bottom, and wherein there is connection between a discharge side of the pump step opposite each bearing (15,16) and bearing faces of the bearing in question, and wherein there are drains from each bearing to an intake side of the pump step, characterised in that the first main bearing (15) near the coupling (10,10A) at the upper end of the pump shaft (11) is a purely radial bearing (15), that the second main bearing (16) opposite the coupling (10, 10A) at the lower end of the pump shaft (11) is a radial and axial bearing, said intake side (5) being arranged in a hollow (31) in the tank bottom.

8. A liquid tank and centrifugal pump (1) according to claim 7, characterised in that the main bearings (15,16) have bearing faces of carbon or silicon carbide.

9. A liquid tank and centrifugal pump (1) according to claim 7, characterised in that the coupling (10, 10A) between the drive shaft (6) and the pump shaft (11) is a magnetic coupler.

10. A liquid tank and centrifugal pump (1) according to claim 7, characterised in that, in the connection (25) between the discharge side of a pump step and the associated bearing faces of the main bearing, a filter 24) is provided for separating impurities and which is preferably a cyclone filter.

11. A liquid tank and centrifugal pump (1) according to claim 10, characterised in that the residual fraction from the cyclone filter (24) is recycled to the pump for the pump step from where the outlet for lubricant is effected.

12. The use of a liquid tank and centrifugal pump (1) according to claim 7 as storage tank on a tanker.

* * * * *